July 17, 1928.
E. J. SWEETLAND
1,677,503
FILTER
Filed Jan. 22, 1920 2 Sheets-Sheet 1
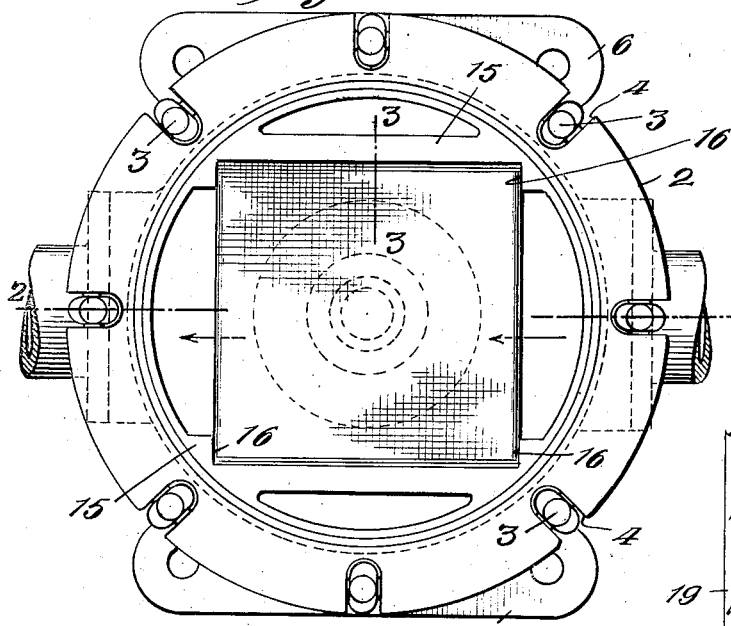
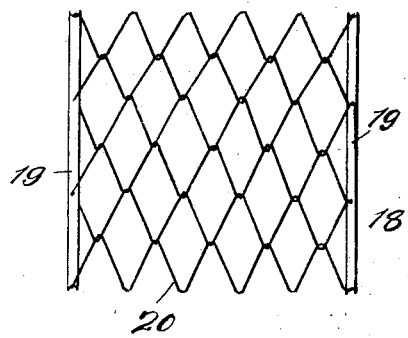
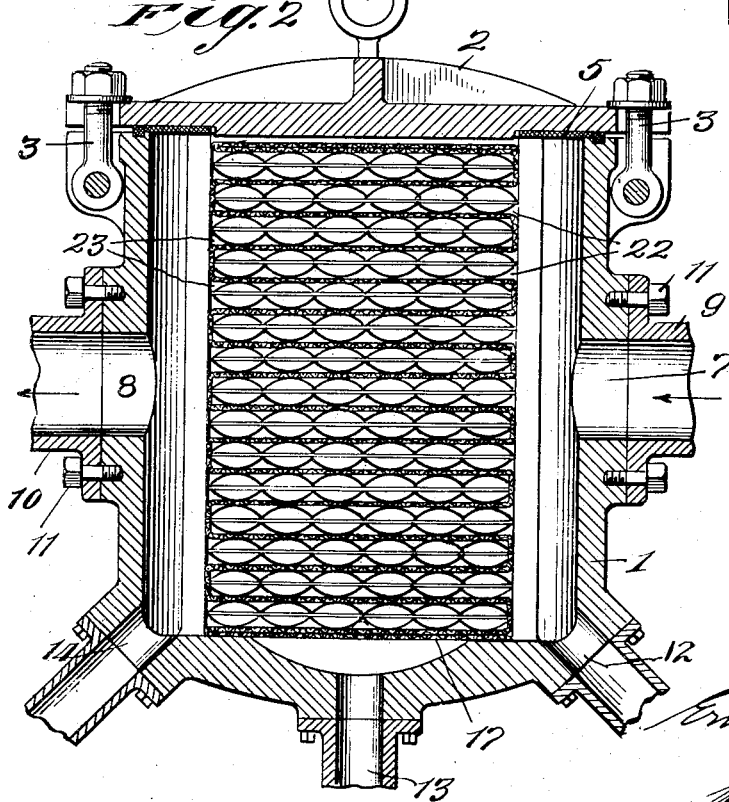
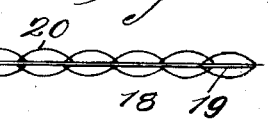
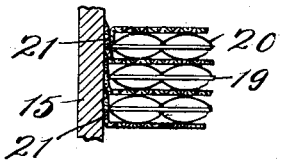

July 17, 1928.
E. J. SWEETLAND
FILTER
Filed Jan. 22, 1920
1,677,503
2 Sheets-Sheet 2
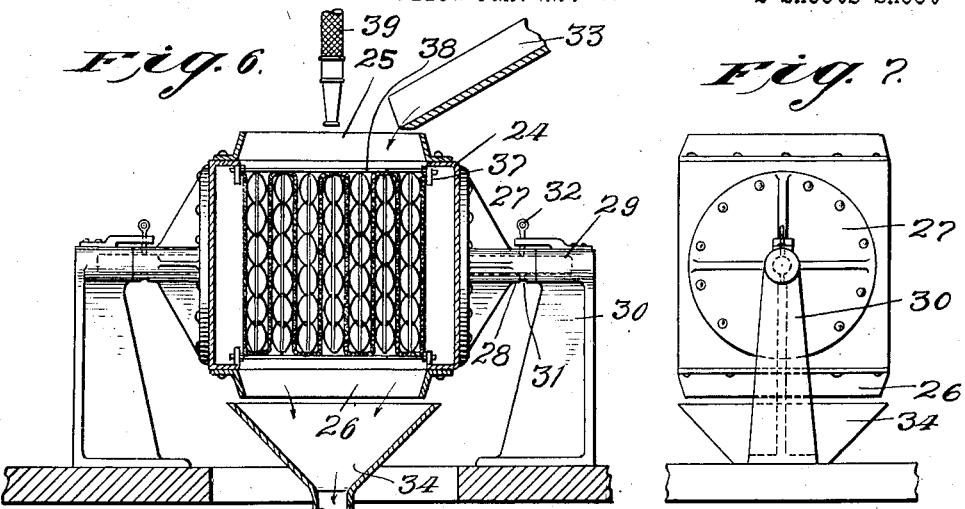
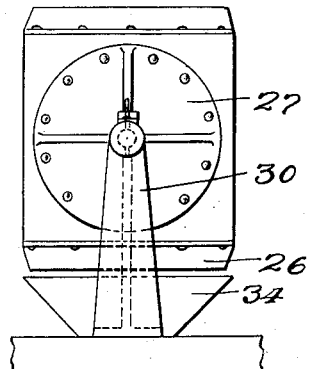
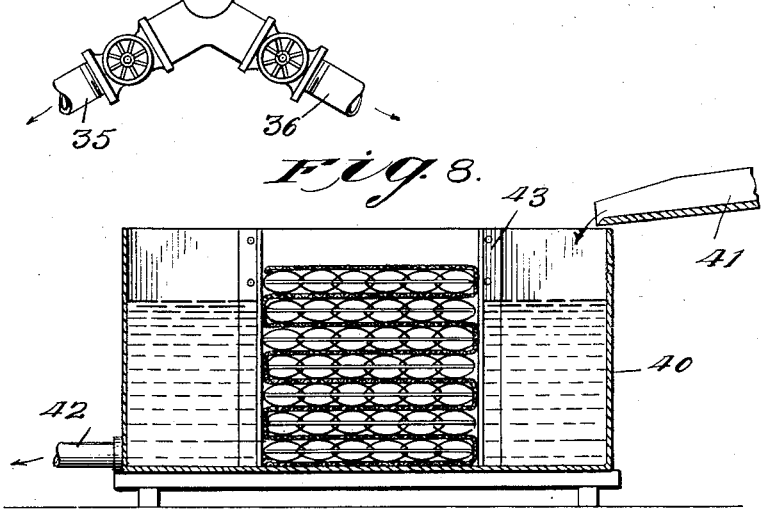
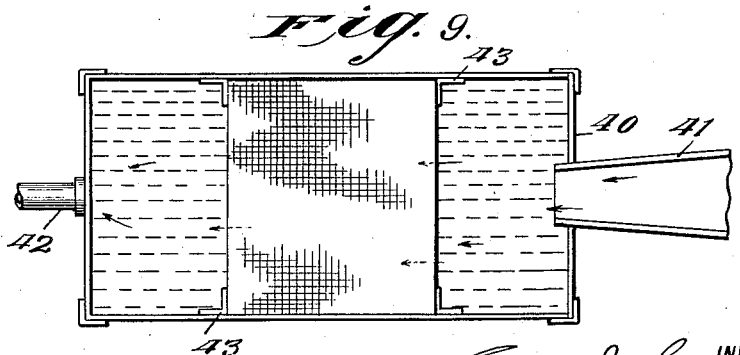

Patented July 17, 1928.

1,677,503

UNITED STATES PATENT OFFICE.

ERNEST J. SWEETLAND, OF MONTCLAIR, NEW JERSEY.

FILTER.

Application filed January 22, 1920. Serial No. 353,219.

This invention relates to improvements in filters adapted for use in connection with the filtering of fluids of any description and one of the objects thereof is to provide a filtering area of extensive surface and occupying a comparatively small space.

The invention, further, has for its objects to provide a filter which is simple in construction, economical to manufacture, and efficient in use. It is also the purpose of the invention to provide a filter, the several parts of which may be quickly and easily separated or removed when it is necessary or desirable to clean or repair the same.

Another object is to provide a filter and method of making same whereby an effective and extensive filtering surface may be provided by merely folding and spacing the folds of the filter material as it comes from the rolls or bolts in which it is purchased without cutting, fitting or sewing the same into a particular or special form.

The invention, further, has for its object to provide a filter by means of which a large quantity of fluid may be filtered within a short period of time and which will permit of the filtering operation being carried on without interruption for a long period of time.

Other objects will in part be obvious and in part be pointed out hereinafter.

In the accompanying drawings, forming part of this application, wherein are shown several illustrative embodiments of the invention, Figure 1 is a plan of one form of a filter constructed in accordance with my invention, the cover being removed;

Figure 2 is a sectional view taken on the line 2—2 of Figure 1, the cover being shown in position;

Figure 3 is a detail sectional view taken on the line 3—3 of Figure 1;

Figure 4 is a plan of a portion of one of the spacing members;

Figure 5 is a side elevation of the member as shown in Figure 4;

Figure 6 is a central vertical sectional view of another form of filter;

Figure 7 is an end elevation of the same;

Figure 8 is a central vertical sectional view of still another form of filter, and Figure 9 is a plan thereof.

Referring to Figures 1 to 5, inclusive, the filter is shown as comprising a cylindrical casing 1 provided with a cover 2, which is removably secured in position by bolts 3 rotatably mounted upon the casing and adapted to be received within notches 4 formed in the cover, at its outer edge. Suitable sealing means 5 are interposed between the cover 2 and the casing 1 to form a fluid-tight joint therebetween. The casing 1 is provided with outwardly extending brackets 6 by means of which it may be mounted upon a support of any suitable construction.

The casing 1 is provided, intermediate its upper and lower ends, with oppositely disposed inlet and outlet openings 7 and 8 adapted to register with the supply and discharge pipes 9 and 10, to which the casing is secured by bolts 11. At its lower end, the casing is provided with a plurality of drainage outlet openings 12, 13 and 14, and the flow of fluid through these openings is adapted to be controlled by suitable valves or cocks not shown.

Within the casing 1 and preferably formed integral therewith, are vertical partitions 15 which are spaced from one another to permit the flow of fluid therebetween as it passes through the casing 1. The inner surfaces of the partitions 15 have recesses or channels 16 formed therein and extending throughout the height of the partitions and serve to hold the filter body in position, as hereinafter described.

The filter body comprises a filtering member 17 consisting of a strip of any suitable filtering material, which is folded to and fro in a zig-zag manner as clearly shown in Figures 2, 6 and 8. Interposed between adjacent portions of the filter member 17 and serving to maintain them in separated relation to one another, are spacing members 18, which are so constructed as to perform the desired function without offering appreciable resistance to the flow of fluid.

As shown for the purposes of illustration, the spacing members 18 comprise parallel side members 19, formed of thin strips of metal, to which are secured a plurality of interlaced coils of wire 20 arranged in parallelism with one another and extending above and below the side members 19, as shown in Figure 5. It is of course to be understood that the invention is not to be limited to the particular form of spacing member shown as the same may be formed of any foraminous or reticulated material, such as expanded metal or it may be of any suitable construction to maintain the folds of the filtering member spaced from one another without impeding the flow of fluid therebetween. The filter body, comprising a plurality of spacing members 18 arranged in register with one another and having the filtering member 17 folded back and forth between adjacent members, as above described, is placed within the casing 1, between the partitions 15, with the folds of the filtering member 17 extending in the direction of the flow of the fluid through the casing 1. The side edges of the filter body extend within the recesses 16 in the partitions, whereby it is firmly held in position. In order to prevent any unfiltered fluid from passing between the filter body and the walls of the recesses 16, the strip of filtering medium 17 is of greater width than the spacing members 18 thus providing laterally extending portions 21. As the filter body is slid into place within the casing, the portions 21 of the filtering member will be forced upwardly into overlapping relation with one another, by frictional engagement with the inner walls of the recesses, as shown in Figure 5, thereby forming an effective seal between the filter body and the partitions 15.

The filter body may be considered as comprising two sets of fluid compartments or passages arranged in alternating relation with respect to one another, the compartments 22 of one set being in communication with the inlet opening 7 of the filter and the compartment 23 of the other set being in communication with the outlet or discharge opening 8 thereof.

In use, the filter body is positioned within the filter casing 1, as above described, the cover 2 is secured in position, and the valves or cocks controlling the flow of fluid through the openings 12, 13 and 14, at the lower portion of the casing, are closed. The fluid to be filtered, which may be either a liquid or a gas, is then introduced into the filter casing through the pipe 9 and inlet opening 7. The fluid flows into the several compartments 22 of the filter body from which it passes through the several folds of the filtering material 17 into the compartments 23. As the fluid passes through the filtering material, any matter carried by or suspended in the fluid is extracted therefrom by the material, and prevented from passing into the compartments 23, thereby insuring that only clear, filtered liquid will be received within these compartments. The filtered liquid flows from the casing 1 through the outlet opening 8 and into the discharge pipe 10 by which it is delivered to any desired fluid receiving means.

After the filtering operation is completed, or at any desired time, the filter may be cleaned, by causing a cleaning fluid to pass through the filter in the reverse direction in the usual manner. Any fluid or other matter which may be retained within the filter may be drained therefrom through the openings 12, 13 and 14 by opening the valves or cocks controlling the same.

Referring to Figures 6 and 7, there is shown a modified form of filter, comprising a casing 24 having inlet and outlet openings 25 and 26, in the upper and lower walls thereof. Secured to the ends of the casing 24 are plates 27 having outwardly extending sleeves 28, and axles 29 which are fixed to and project beyond the sleeves and have their outer ends journaled within standards 30. The sleeves 28 are provided with oppositely disposed holes 31 adapted to receive the inner end of a set screw 32, whereby rotation of the casing 24 is prevented. The fluid to be filtered is introduced into the inlet opening 25 of the filter casing in any suitable manner, as by a trough-shaped member 33. The filtered fluid is discharged into a funnel shaped member 34 from which it flows through one of the two pipes 35 and 36 communicating therewith. The filter body within the casing 24 is constructed in the manner above described but as the fluid flows from the upper portion of the casing to the lower portion thereof, the filter body is so positioned that the compartments formed between adjacent folds of the filtering material are vertical instead of horizontal. The parts of the filter body are held in their assembled positions by strips 37 engaging the upper and lower edges thereof and clamping members 38. A hose 39, or the like, is provided for supplying cleaning fluid.

In use, the casing 24 is held against rotation in the position shown by means of the set screws 32 engaging one of the holes 31 in the sleeve 28, and the fluid to be filtered is introduced into the filter by means of the trough 33. The fluid passes through the filter body, and is filtered thereby in the manner above described, and the clear, filtered fluid then passes into the member 34 from which it is discharged through the pipe 35, for example by opening the valve associated with this pipe and closing the valve associated with the pipe 36. When it is desired to clean the filter, the set screws are withdrawn from the holes in the sleeve with which they are in engagement, the casing is then inverted by rotating the same, after which the set screws are caused to engage the other holes in the sleeve to retain the casing in its inverted position. The valve in the pipe 36 is opened and the valve in the pipe 35 is closed, after which cleaning fluid is introduced by means of the hose. As the casing has been inverted, the cleaning fluid passes through the filter body in a reverse direction to that of the fluid to be filtered, and consequently any matter adhering to the filtering material will be removed therefrom and discharged together with the cleaning fluid through the pipe 36.

The modification shown in Figures 8 and 9 shows a filter comprising a rectangular casing 40 having a trough 41 adjacent one end thereof to deliver the liquid to be filtered into the casing and having a discharge pipe 42 at the other end of the casing adjacent its lower portion. The filter body is constructed as above described, and is held in position within the casing by means of vertically extending angle irons 43 secured to the side walls of the casing 40, and forming a channel therewith to receive the side edges of the filter body. The filter body is placed in position within the casing 40 in a similar manner to that above set forth in connection with the form of filter shown in Figures 1 to 5, inclusive, and the operation of the filter, is the same, in both instances.

By forming the filter member as shown, it will be seen that the several portions or folds thereof constitute a filtering surface of extensive area, which is contained within a comparatively small compass, and which permits of the filtration of a great quantity of fluid within a given period of time. Furthermore, by providing an extensive filtering surface, it will not become clogged up by the impurities extracted from the fluid as quickly as will a surface of smaller area, and therefore, the filtering operation may be carried on for a long time without interruption. The filter member may be made of woven cloth, such as cotton, linen or wool and it may be made of asbestos, woven metallic fabric made of wire or reticulated metal, or even may be made of chamois skin or felt, in fact any suitable material depending upon the character or kind of matter to be filtered, as experience or expediency may dictate or require.

One of the great economies resulting from the use of my filter is that no cutting and sewing of the filter cloth into a bag or other particular shape is necessary. The cloth may be taken from the roll or bolt as purchased and folded into the form shown, with a drainage member between each fold, and inserted directly into the casing without being sewed or secured in place in any way other than by the walls of the filter casing. As described in connection with Figure 3, the strip of cloth is preferably slightly wider than the drainage elements so as to effectively seal the ends of the filter element.

To disassemble the filter for cleaning or repair the filter element is removed from the channels 16, the drainage members 18 removed and the single rectangular strip of cloth may then be cleaned by washing, brushing, vacuum cleaning or the like on either or both sides and returned to the casing, refolded and with the drainage members in place ready for use.

A filter embodying the principles of my invention as above described may be put to many divers uses, among which may be particularly mentioned boiler-feed filtration, and the filtration and conditioning of air for hydro-carbon engine use. In the latter instance, the invention lends itself admirably to the purpose since its compact nature and extensive filtering area enables it to be readily located near the carburetor and is capable of efficiently filtering the large volume of air demanded by the engine. Of course, I do not desire to be limited in matters of structural arrangement of the parts or their proportions but wish to cover the principles of my invention broadly in whatever manner they may be carried into practice or in any use to which they may be put.

Having thus described my invention what I claim as new herein and desire to secure by Letters Patent is:

1. A filter comprising a one-piece casing provided with oppositely disposed channels, and a folded filter member within said casing having its lateral edges extending within said channels and folded therein to seal the edges of said filter member against the flow of solids therethrough without sewing or cutting said member.

2. A filter comprising a casing provided with oppositely disposed channels, a folded filter member and spacing members interposed between adjacent folds of said filter member, the lateral edges of said filter member and of said spacing members being received within said channels to seal the edges of said filter member against the escape of solids therethrough.

3. A filter comprising a casing provided with oppositely disposed channels, a plurality of spacing members positioned within said casing and having their lateral edges received within said channels and filtering material interposed between adjacent spacing members and having lateral portions arranged in overlapping engagement with one another and in engagement with said channels.

4. A filter, including a casing, a substantially rectangular filter receiving opening in said casing, inlet and outlet openings on opposite sides of said filter receiving opening, and a substantially rectangular filter, comprising a substantially rectangular strip of filter material folded back and forth to form a plurality of rectangular filtering surfaces and a rectangular drainage member between each fold, said filter material being wider than said rectangular opening so that the edges thereof are folded over when the filter is placed in said casing to form an uninterrupted filter wall between said inlet and outlet openings.

5. The method of forming a filter which comprises folding a rectangular strip of filter fabric back and forth, inserting a spacing and drainage member, narrower than the fabric between each fold, and inserting the folded filter element into a filter casing having an opening wider than the spacing and drainage elements but narrower than the width of said fabric so as to fold the edges of the fabric over to retain the same in place and seal the edges against the passage of solids therethrough.

6. A filter comprising a casing provided with oppositely disposed channels and a filter body comprising a long rectangular strip of filtering material folded alternately between a plurality of rectangular drainage members removably positioned within said casing and engaging said channels, said filter material being wider than the space between said channels, so that the edges of the filter material are folded when the filter body is inserted into the channels to close the filter body on all sides.

7. A filter comprising a casing provided with oppositely disposed channels and a filter body removably positioned within said casing and engaging said channels to seal the edges thereof, said filter body comprising a single rectangular strip of filtering material in a plurality of folds and a plurality of spacing members arranged in alternating relation one between each fold.

8. A filter comprising a casing having a rectangular opening on the inside thereof and a filter body comprising a folded strip of filtering material, and unconnected foraminous spacing members interposed between adjacent folded portions of said strip, said spacing members being substantially coextensive in area with the lateral area of said folded portions and of the cross-sectional area of said rectangular opening and said spacing members being of slightly less length than the length of the folded portions.

9. A filter comprising a filter casing having a rectangular opening therein and having inlet and outlet openings and a filter body removably placed within said casing, said filter body comprising a rectangular strip of flexible fabric slightly wider than said rectangular opening folded into a plurality of rectangular folds and a plurality of quadrangular spacing members loosely placed between the folds of said fabric.

10. A filter comprising a casing, having an inlet and outlet opening, a filter pack removably placed between said openings, said filter pack comprising a strip of flexible filter fabric substantially rectangular in form which is folded backwards and forwards to form a plurality of parallel filter surfaces and a spacing member between each of said folds, the edges of said filter fabric being placed in said casing to make a filtering contact without clamping or sewing the same.

11. A filter comprising a casing having a rectangular opening, a filter fabric in the form of a rectangular strip, said strip of fabric being loosely folded back and forth to form a plurality of substantially parallel filter surfaces and rectangular means to hold said surfaces apart, said rectangular means being shorter than the width of said fabric to leave an edge of said fabric projecting from each end of the rectangular spacing means to be folded over between the walls of said opening and said spacing means to form a filter without cutting or sewing.

12. A filter comprising a casing with a filter element removably mounted within said casing, said element including a single rectangular strip of flexible filter fabric folded to form a plurality of filter surfaces and a quadrangular spacing member between each of said surfaces, said spacing members being so arranged as to provide space for the entrance of unfiltered liquid on one side of the cloth and space for the drainage of filtered liquid on the opposite side thereof, and said casing and spacing members acting to close the edges of said filter element so that no cutting or sewing of filter fabric is necessary to form the filter.

ERNEST J. SWEETLAND.